United States Patent Office 3,098,054
Patented July 16, 1963

3,098,054
COMPOSITION COMPRISING EPOXY RESIN, POLYVINYL ACETAL, SILICA, AND A BF₃-AMINE COMPLEX
Joseph Rosenberg, Erie, Pa., assignor to General Electric Company, a corporation of New York
No Drawing. Filed Nov. 20, 1959, Ser. No. 854,224
7 Claims. (Cl. 260—41)

This invention relates to new and useful resinous compositions and their preparation. More particularly, the invention relates to resin compositions having desirable physical, chemical and electrical properties and which are especially characterized by a desirably high impact strength which is obtained without the use of fibrous fillers.

Epoxy, epoxide or ethoxyline resins as they are variously called are well known in the art. Such epoxy resins may comprise a polyether derivative of a polyhydric organic compound, the derivative containing 1,2 epoxy groups, the compound being selected from the class consisting of polyhydric alcohols and phenols containing at least 2 phenolic hydroxy groups. For example, U.S. Patent 2,324,483—Castan discloses epoxy resin compositions comprising the reaction product of phenols having at least two phenolic hydroxy groups and an epihalogenohydrin such as epichlorohydrin, the product having at least two epoxy groups and being cured to a thermoset infusible mass by the use of a carboxylic or polybasic acid or acid anhydride such as phthalic anhydride. Other well known epoxy resins are the epoxidized derivatives of ethylenic compounds, such derivatives having more than one epoxy group per molecule. The use of organic nitrogen base or amine type materials to cure epoxy resins is also well known as set forth, for example, in Patent 2,444,333, such materials often giving a rapid cure at room temperature. Normally, however, the pot life of amine-cured epoxy resins is comparatively short and their high temperature characteristics often poor.

Generally, in applications requiring a high impact strength, such as in coating applications which must withstand physical abuse, epoxy resins are filled with fibrous material which is well known as an impact strength increaser. Among the fibrous materials so used are chopped or milled glass fibers, silica fibers, and asbestos fibers, as well as various other textile fibers. However, in certain applications, as where the epoxy resin composition is to be ground to a relatively fine powder for use in coating applications, such as by the fluidized bed process, for example, it will be obvious that fibrous fillers cannot be used.

It is also well known that the use of various proportions of polyvinyl acetal compositions in conjunction with an epoxy resin tends to increase the impact strength of the material. However, in actual practice, it has been found that the normal compositions containing polyvinyl acetal and epoxy resin are not suitable to meet present-day requirements in this respect.

A principal object of this invention is to provide epoxy resin containing compositions which are characterized by improved impact strength and which may be ground into relatively fine powders as for coating by the fluidized bed process.

It has unexpectedly been found that when epoxy resin-polyvinyl acetal compositions filled with finely divided fillers are cured by particular BF₃-amine complex materials, namely BF₃·piperidine complex, BF₃·triethanolamine complex, or other well-known BF₃ amine complexes, said complexes having decomposition points greater than 130° C., the impact strengths obtained are unexpectedly high.

In general, the compositions of the invention comprise by weight 100 parts epoxide resin, from about 35 to 100 parts polyvinylal resin, from about 0.1 to 4 parts fumed or very finely divided silica, from about 25 to 75 parts finely divided silica, and from about one to ten parts of the BF₃·amine complex curing agent.

Those parts of the invention which are believed to be new are set forth with particularity in the claims appended hereto. The invention will, however, be better understood from a consideration of the following description.

The ethoxyline resins used in conjunction with my invention are, as pointed out above, well known in the art. They are described in Castan United States Patents Nos. 2,324,483 and 2,444,333, British Patent No. 518,057 and British Patent No. 579,698. Generally, the ethoxyline resins described therein are the reaction product of an epihalogenohydrin such as epichlorohydrin and a phenol having at least two phenolic hydroxy groups such as bis-(4-hydroxy phenyl)-2,2-propane. United States Patents Nos. 2,494,295; 2,500,600 and 2,511,813 describe further ethoxyline resins which can be used in conjunction with my invention.

The above patents are hereby incorporated by reference in this application. The ethoxyline resins used herein have more than one epoxy group per molecule. They can be prepared by reacting a polyhydroxy alcohol or phenol such as hydroquinone, resorcinol, glycerine and condensation products of phenols with ketones, for example, bis-(4-hydroxy phenyl)-2,2-propane with epichlorohydrin. The reaction of epichlorohydrin with bis-(4-hydroxy phenyl)-2,2-propane is as follows:

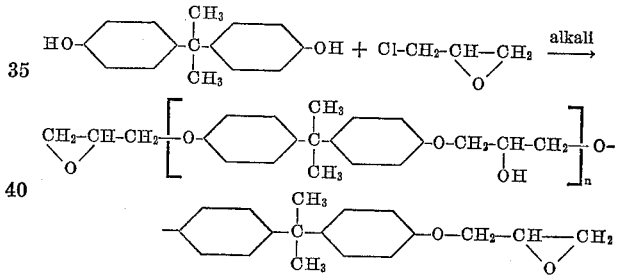

where n has an average value ranging from 0 to about 7. Such ethoxyline resins are sold under the name of Epon by Shell Chemical Corporation, under the name Araldite by the Ciba Company, as Epi-Rez resins by Devoe-Raynolds Company, and ERL resins by the Bakelite Company. The data given below for such resins is representative.

TABLE I

| Epoxy Resin | Epoxide Equivalent | M.P. (° C.) |
|---|---|---|
| Epon 820 | 192 | Liquid |
| Epon 828 | 192 | 9 |
| Epon 834 | 225–290 | 20–28 |
| Epon 1001 | 425–550 | 65–75 |
| Epon 1002 | 550–700 | 75–85 |
| Epon 1004 | 870–1,025 | 95–105 |
| Epon 1064 | 300–375 | 40–45 |
| Araldite 6010 | 192 | Liquid |
| Araldite 6020 | 200–205 | Liquid |
| Araldite 6060 | 425 | 60 |
| ERL 2774 | 195–200 | Liquid |
| Epi-Rez 410 | 175–200 | Liquid |
| Bakelite 2774 | 190–196 | Liquid |

Epoxide resins may also be prepared by reacting diolefins with peracids such as, for example, peracetic acid. The diepoxides are available from the Union Carbide Chemicals Co. or the Becco Chemical Division of the Food Machinery and Chemical Corp. Examples are limonene dioxide, vinyl cyclohexene dioxide or epoxidized polybutadienes. Other useful epoxy resins will occur to those skilled in the art.

The polyvinylal or polyvinyl acetal resins employed herein are produced by suitably combining an aldehyde with partially or completely hydrolyzed, polymerized vinyl esters, such materials being set forth, for example, in Patent 2,307,588, assigned to the same assignee as this invention, as well as Reissue Patent 20,430. Among the aldehydes which may be used to make polyvinylal resins are formaldehyde, acetaldehyde, propionicaldehyde, butyraldehyde, benzaldehyde and the like. Also, polyvinyl esters other than the usual polyvinyl acetates may be employed, for example, polyvinylpropionate, polyvinylbutyrate, and the like. It will be realized that the properties of the polyvinylal or polyvinyl acetal resins can be varied through a rather wide range by adjusting the viscosity and the extent of hydrolysis of the polyvinyl ester, the amount and character of the aldehyde or aldehydes reacted with the hydrolyzed polymerized vinyl ester, and the character and amount of acid catalyst used.

While any of the usual well-known finely divided filler materials used in conjunction with resinous materials may be employed in conjunction with the present invention, the silica containing fillers are generally preferred. Both the relatively coarse and finely divided silicas, as well as the very finely divided silicas or both can be used. Typical of the coarser materials are those generally known as 200-mesh silica fillers. Among the very finely divided silicas which are useful are Cab-O-Sil, a fumed finely divided silica produced by the Godfrey L. Cabot Company, along with other similar materials produced by the same company, silica aerogel (e.g., Santocel, produced by Monsanto Chemical Company); HI-Sil-X303, a finely divided precipitated silica made by the Columbia-Southern Chemical Corporation; diatomaceous earth, such as Celite Superfloss, made by Johns-Manville, etc. In addition to the silica fillers, other fillers or pigments can be used to color or modify the final products as desired.

The materials of the present invention are very readily prepared. Typically, the epoxy resin is heated to 180° C. and the fillers added with stirring. The mixture is maintained at or reheated to 180° C., and the polyvinyl acetal added with more stirring. The temperature is allowed to fall to about 90–130° C. during the addition. The mixture is cooled by pouring into liquid nitrogen or other cooling means employed. A hammermill may be used to pulverize the material. In every case, the resins and curing agents, while they are heated together and reacted to a certain degree, are not reacted to the gel stage.

The following examples will illustrate the practice of the invention but are not to be taken as limiting in any way.

EXAMPLE 1

To 67 grams of Araldite 6060 and 33 grams of Epon 1004, heated to 180° C., there was added 55 grams of 200-mesh silica and 3 grams of fumed silica of the Cab-O-Sil type with stirring. With continued stirring, 40 grams of polyvinyl formal resin (Formvar 7/70E) was added until solution was complete. After the temperature had fallen to about 90° C., 3 grams of $BF_3 \cdot 400$ consisting of the complex of $BF_3$ and monoethylamine was added and stirring continued for about 5 minutes until complete homogeneity had been attained. The mixture was then poured into liquid nitrogen and pulverized with a hammermill while cooling to a fluidized particle state. This example illustrates the preparation of such materials using other than the preferred curing agent.

EXAMPLE 2

Example 1 was repeated using 75 grams of Araldite 6060 and 25 grams of Epon 1004, along with 40 grams of polyvinyl formal resin as above, 3 grams of a $BF_3 \cdot$ethylamine complex, along with 50 grams of 200-mesh silica and 3 grams of fumed Cab-O-Sill type silica.

EXAMPLE 3

Example 1 was repeated using 100 grams of Araldite 6060, 40 grams of polyvinyl formal resin as above, 4 grams of $BF_3 \cdot$piperidine complex curing agent, 70 grams of 200-mesh silica, and 3 grams of Cab-O-Sil type fumed silica.

EXAMPLE 4

Example 1 was repeated using as the epoxy resin 50 grams of Epon 1001 and 50 grams of Epon 1004, 40 grams of polyvinyl formal resin as above, 25 grams of finely divided mica, 0.6 gram of Cab-O-Sil, and 0.75 gram of dimethyl soya diamine curing agent.

EXAMPLE 5

Example 1 was repeated using 100 grams of Epon 1002, 3 grams of fumed silica, 4 grams of $BF_3 \cdot$piperidine complex, and 50 grams of 200-mesh silica.

EXAMPLE 6

Example 1 was repeated using 100 grams of Araldite 6060, 40 grams polyvinyl formal resin as above, 5 grams of $BF_3$-triethanolamine complex, 70 grams of 200-mesh silica and 1 gram fumed silica.

Cleaned cold-rolled steel panels about 3 inches square and 0.025 in. were coated by heating the panels to a temperature of about 150° C. and then dipping in a bed of materials such as those above which had been fluidized in the well-known manner. Immediately after dipping, the panels were removed and stored, and then placed in an oven for curing in a single lot at temperatures of 150° C. for about 16 hours.

After being cured, the panels were conditioned for about 24 hours in a testing room in which the atmosphere was maintained according to ASTM D618–54. The thickness of five distributed points on each panel was determined, and the panel placed in a Gardner "Coverall" mandrel impact tester for testing at each of these five points. Generally, this impact tester consists of a metal base over which a steel tube calibrated in inch-pounds is suspended. A 4-pound weight in the shape of a rod is dropped during testing from various heights in the tube onto the test panel, the impact result being sensitive to the radius of the surface of impact. In order to determine a starting point, a coated panel was struck from increasing heights until one failure was observed, such failure being taken as the first time a break had occured in the coating as observed with a binocular microscope at 15×2 magnification. This impact value was then used at ten additional points, or on two panels of the same thickness.

The basis of comparison was arbitrarily established at the 50% passing level and the results of these ten blows determined which direction the change of level of impact should take. Thus, enough additional levels of impact were used (a minimum of four) to determine this "50% passing" value. The results of such impact testing with the materials of the above examples are set forth in Table II below.

TABLE II

*Impact Strength*

| Example | ¼″ Radius (in.-lb.) | ½″ Radius (in.-lb.) |
| --- | --- | --- |
| 1 | 11.3 | 99.0 |
| 2 | 10.4 | 90.7 |
| 3 | 32.0 | 144 |
| 4 | 8.0 | 43.1 |
| 5 | 10.7 | |
| 6 | 33.0 | |

From the above table, it can readily be seen that those materials comprising epoxy resin and polyvinyl acetal resin filled with silica as noted and cured with a boron-trifluoride-piperidine or boron trifluoride-ethanolamine complex material had impact strengths far and away better than such materials cured with other basic type curing agents. It will be noted from the data relative to Example 4 that the present resinous materials are far superior also to those cured with basic type materials other than those of this invention. From the data on Example 5, it will be seen that the present salutary results with respect to impact strength are not due only to the boron trifluoride-piperidine complex itself, but to a combination of this material with the polyvinylal material, taken in conjunction with the other constituents. It has been found that, in general, boron trifluoride-amine complexes which decompose at temperatures over about 130° C. are useful in connection with this invention. The boron trifluoride-piperidine complex starts to decompose at about 135° C. Another useful material, the boron trifluoride-triethanolamine complex, begins to decompose above 150° C.

Not only are the materials of the present invention characterized by suitable physical properties as shown above, but their shelf life is quite extensive, being well over one year.

By the present invention, there are obtained epoxy resin-polyvinylal resin compositions which are characterized by desirable physical properties, including high impact strength and good thermal stability. At the same time, these desirable physical properties are obtained not by the use of fibrous fillers as is usual in such cases, but by the use of finely divided filler such as silica fillers. This in turn permits the compositions to be partially reacted short of the gel stage, and then ground into fine powders which may be used for coating purposes by the fluidized bed process as well as in the usual well known manners.

What I claim as new and desire to secure by Letters Patent of the United States is:

1. A composition of matter comprising, by weight, 100 parts of epoxy resin containing 1,2 epoxy groups, from about 35 to 100 parts of polyvinyl acetal resin, from about 25 to 79 parts of a material comprising fumed silica, and from about 1 to 10 parts of a boron trifluoride-amine complex curing material, said curing material having a decomposition point of over about 130° C.

2. A composition of matter comprising an epoxide resin containing 1,2 epoxy groups, a boron trifluoride amine complex curing agent for said epoxide resin having a decomposition temperature of over about 130° C., fumed silica filler, and polyvinyl acetal resin.

3. A composition of matter comprising, by weight, 100 parts of epoxy resin containing 1,2 epoxy groups, 4 parts of boron trifluoride-piperidine complex curing agent, 40 parts polyvinyl acetal resin, 73 parts of a material comprising fumed silica.

4. A composition of matter comprising, by weight, 100 parts of epoxy resin containing 1,2 epoxy groups, 40 parts of polyvinyl acetal resin, 5 parts of a curing agent for said epoxy resin comprising a boron trifluoride-triethanolamine complex, 70 parts of 200-mesh silica, and 1 part of fumed silica.

5. The process of making a resinuous composition of matter which is characterized by superior physical qualities which comprise heating an epoxy resin containing 1,2 epoxy groups to about 180° C., adding thereto fumed silica fillers, adding to the mixture polyvinyl acetal resin while allowing said temperature to fall to from about 90° C. to 130° C., and adding thereto at about 90° C. a boron trifluoride amine complex epoxy resin curing agent which begins to decompose at temperatures of at least 130° C. and curing at a temperature of at least 130° C.

6. A structure coated with a composition of matter comprising an epoxide resin containing 1,2 epoxy groups, a boron trifluoride amine complex curing agent for said epoxide resin having a decomposition temperature of over about 130° C., finely divided silica filler and polyvinyl acetal resin.

7. A composition of matter comprising an epoxy resin containing 1,2 epoxy groups, polyvinyl acetal resin, a filler comprising fumed silica and a boron trifluorideamine complex curing agent selected from the group consisting of boron trifluoride-triethanolamine complex and boron trifluoride-piperidine complex.

References Cited in the file of this patent

UNITED STATES PATENTS

| | | |
|---|---|---|
| 2,528,934 | Wiles | Nov. 7, 1950 |
| 2,713,567 | Scheibli | July 19, 1955 |
| 2,824,083 | Parry et al. | Feb. 18, 1958 |
| 2,967,843 | Delmonte et al. | Jan. 10, 1961 |